March 10, 1964   B. HOWLAND   3,124,726
FLUX CONCENTRATOR FOR HIGH INTENSITY PULSED MAGNETIC FIELDS
Filed Oct. 5, 1960

INVENTOR.
BRADFORD HOWLAND
BY Edward D. Thomas
AGENT

United States Patent Office 3,124,726
Patented Mar. 10, 1964

3,124,726
FLUX CONCENTRATOR FOR HIGH INTENSITY PULSED MAGNETIC FIELDS
Bradford Howland, Cambridge, Mass., assignor, by mesne assignments, to Massachusetts Institute of Technology, a corporation of Massachusetts
Filed Oct. 5, 1960, Ser. No. 60,610
9 Claims. (Cl. 317—158)

The present invention relates generally to the production of high intensity pulsed magnetic fields and more particularly to a flux concentrator having minimum leakage inductances and mechanical forces.

Many experiments involving the use of high magnetic fields can be carried out on a transient basis which greatly reduces the power requirements to relatively modest equipment when pulse duration and pulse repetition rate are not critical. The structural strength of the system becomes the factor limiting the magnetic field intensity since the thermal stress caused by ohmic dissipation and mechanical stress arising from the Lorentz force both increase roughly as the square of the magnetic field. At the half-megagauss level, the axial magnetic field of a coil exerts a radial pressure of the order of 7 tons cm.$^2$.

The structural strength of a coil can be increased substantially by means of mechanical reinforcement. Thus, Furth et al., Review Scientific Instruments, vol. 28, page 1949, 1956 "Production and Use of High Transient Magnetic Fields II," disclosed the characteristics of a single turn coil which was contained in a massive steel block. Other methods of coil reinforcement fall in the class of magnetic reinforcement. In the production of pulsed fields, the magnetic reinforcement can be achieved by the use of induction currents. Many various coil configurations have been devised, see Furth et al., in which the current and field vectors are made parallel and the Lorentz force vanishes in the region of strong fields. Many such coil configurations require complex design and difficult machining. However, the specific coil configuration, generally referred to as the flux concentrator, acts as a pressure moderator which will bear intense pressures over a small area and translate them as a mild pressure over a large area.

The flux concentrator configuration appears to have been used first by Babat and Losinsky in connection with the inductive heating of steel parts in a high frequency magnetic field, Journal Applied Physics, vol. 11, pages 816–823, December 1940. The flux concentrator takes the form of an air core transformer having a multiturn primary coil and a rigid single turn secondary. The secondary consists of a massive copper hollow cylinder with a slit. The high frequency induced current flows almost entirely on the surface of the secondary and the solid portion of the cylinder contributes to the mechanical rigidity. The induction current generated in the secondary tends to shift the multiturn coil flux into the center opening of the cylinder and relieves the magnetic pressure on the multiturn primary. Since the secondary introduces additional resistance and inductance, there is always some power loss which places the flux concentrator at a disadvantage compared with the efficiency of a mechanically reinforced helical coil or a conventional transformer coupled single turn coil.

The flux concentrator of Babat and Losinsky was used at a frequency of 160 to 230 kc. with a power input of 200 kw. Its application to high intensity pulsed fields has been limited by the structural weakness of the primary multiturn coil and the need for massive mechanical reinforcement.

The primary object of the present invention is to create a distribution of currents and fields by means of coil configuration to minimize the mechanical stress on the primary coil of a flux concentrator.

Another object of the present invention is the elimination of massive mechanical reinforcement clamps from the multiturn primary coil.

A third object of the invention relates to the introduction of electrically insulated, threaded, interchangeable inserts to permit modification of the field configuration in the high intensity region.

Other objects and advantages of the present invention will appear as the description proceeds.

Figure 1:
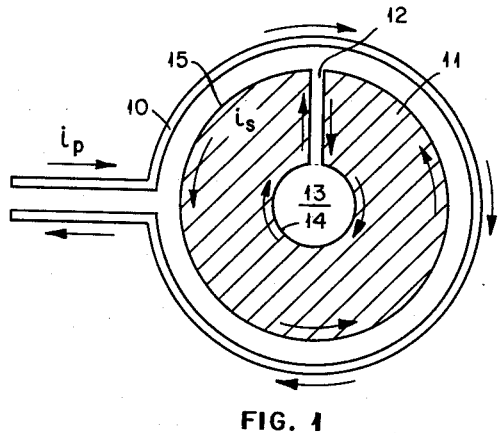
FIGURE 1 is a cross sectional plan view of a flux concentrator showing the secondary current flow for an assumed direction of primary current flow.
Figure 2:
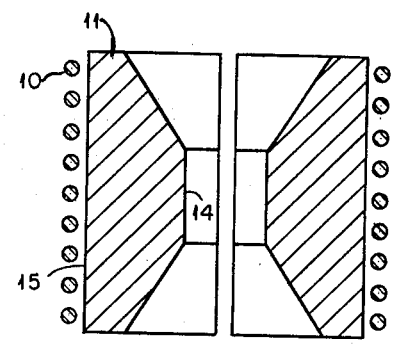
FIGURE 2 is a cross sectional elevation view of the device of FIGURE 1.

The basic configuration of a flux concentrator is shown in FIGURE 1 and FIGURE 2 where a primary coil 10 is wound on the outer surface 15 of a massive metallic hollow cylinder 11, whose circular turn is broken by a narrow slit 12. The induction current $i_s$ is generated on the surface of metal cylinder 11 by current flow $i_p$, from a power source, not shown, and assumes the direction indicated by the arrows when the primary current is increasing. The currents on the outer surface 15 are conducted inward by the slit 12, are reversed in direction on the inner surface 14, and returned to the outer surface again by slit 12. When the axial length of the inner surface 14 is smaller than the axial length of the outer surface 15, the density of current flow on the inner surface is increased in proportion to the decrease in length and the central region 13 will have the magnetic field of greatest intensity. In a very real sense, the current induced on the surface of the secondary 11 may be said to screen the inside of the metal slug from the magnetic field which is forced out of the space occupied by the metal and concentrated in the central region 13.

A quantitative analysis of the flux pattern relevant to the flux concentrator is found in a paper by Kim and Platner, "Flux Concentrator for High Intensity Magnetic Fields," published in Review of Scientific Instruments, vol. 30, No. 7, pages 524–533, July 1959, to which reference may be made.

In brief, when the structure of FIGURES 1 and 2 is used to generate a field, the magnetic force exerted by an axial field of a current carrying coil is exerted outwardly in a radial direction perpendicular to both the current and the field. While the current flows in such a manner as to minimize the coil impedance and is thus driven to the inside surface of the coil, the conducting matter tends to move so as to maximize the coil impedance. The radial force in the coil is:

$$F_r = \tfrac{1}{2} I^2 \frac{dL}{dr}$$

and the axial compressive force is $$F_z = \tfrac{1}{2} I^2 \frac{dL}{dz}$$

Also, as is well known, $$\tfrac{1}{2} I^2 = \frac{1}{8\pi} \int H^2 dV$$

from which it is seen that the force on the coil is roughly proportional to the square of the magnetic field intensity. It is noted that the magnetic force is radially outward for either direction of current flow. There is also a secondary field distribution, established by the flow of induced current on the surface of the secondary turn, which can be thought of as the superposition of two cylindrical current sheets having opposed current flows and differing configuration parameters.

Figure 3:
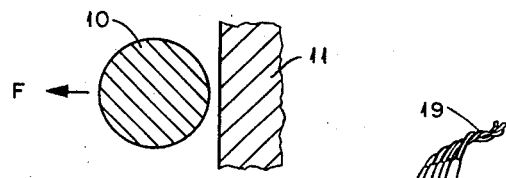
FIGURE 3 is a detailed view of a portion of FIGURE 2.

The resultant field pattern is materially affected by the geometry of the secondary turn. As shown in the above-mentioned paper by Kim and Platner, the action of the flux concentrator to relieve the magnetic pressure on the multiturn primary is imperfect, the leakage flux is considerable and the magnetic force, F of FIGURE 3, on the coil 10 is such that massive mechanical reinforcement is required.

Figure 4:
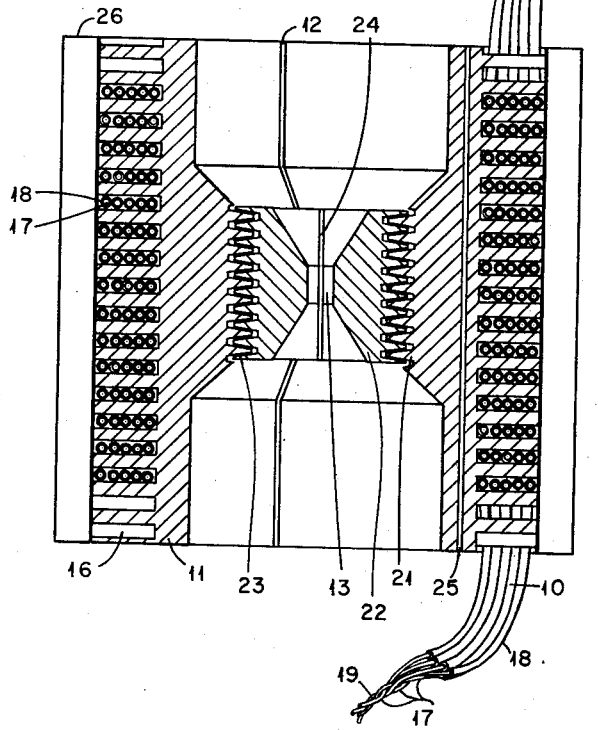
FIGURE 4 is a cross sectional elevation view of the preferred embodiment of the invention.

In order to minimize leakage inductances and the outward radial mechanical forces on the multiturn primary winding, I have modified the prior art flux concentrator structure. As shown in FIGURE 4, the single turn secondary coil is formed by the metallic cylinder 11 which has a radial slit 12. The outer surface 15 of cylinder 11 has a deep helical slot 16 machined along its full length.

The multiturn primary winding 10 is shown made up from a plurality of conductors 17 each having an insulating coating 18. The several conductors 17 are shown connected in parallel at their outer ends 19. However, the exact form of the winding is unimportant. As shown in FIGURE 4, the several conductors are imbedded in helical slot 16 which has a width such that the insulated conductors are a snug fit. The use of the helical slot provides an increased coupling efficiency between the primary winding and the secondary coil 11 as this configuration leads to a material decrease in leakage flux.

Figure 5:
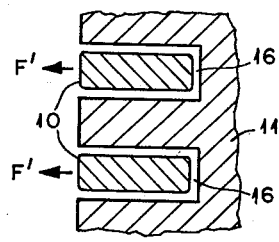
FIGURE 5 is a detailed view of a portion of FIGURE 4.

Assuming that the several conductors 17 may be represented by the single conductor 10 of FIGURE 5 and that the flow of current in the multiturn primary 10 and the single turn secondary 11 is essentially along the surface, it is apparent that the magnetic forces resulting from current flow along the upper and lower surfaces of both conductor 10 and slot 16 tend to cancel and that there remains only a relatively small radial force F′ caused by current flow in the innermost surface of conductor 10. Since current flow in the innermost part of conductor 10 is only a small proportion of the total current flow in conductor 10, the radial force F′ on conductor 10 of FIGURE 5 is quite small compared with the force F exerted on conductor 10 of FIGURE 3.

The inner surface of cylinder 11 is shown to be bored with a taper to an inner threaded portion 21, in FIGURE 4. A threaded metallic insert 22 is provided with a radial slit 24 and electrical contact with cylinder 11 is prevented by a thin insulating tape 23. The plastic material commercially known as "Teflon" has been found satisfactory for this purpose. Insert 22 is also machined with a taper toward the innermost region 13. The radial slit 24 serves the same function that slit 12 provides for block 11. The use of non-contacting, threaded, interchangeable insert 22 permits the field configuration in region 13 of FIGURE 4 to be modified easily by the choice of inserts varying in shape. For example, inserts can be provided with inner bores varying from 2.0 inches to 3/16 inch to produce fields varying in maximum magnetic intensity in proportion to the bore. However, the use of such inserts is not essential to the production of high intensity pulsed magnetic fields by means of the flux concentrator.

The structure of FIGURE 4 provides a single turn conductor 11 which rigidly supports itself because it is massive. The intricate machining is limited to the deep helical slot 16 which is on the outside surface of block 11 and which does not limit the size of block 11. Cooling of block 11 is readily obtained without impairing the rigidity of block 11 by boring longitudinal ducts, such as duct 25, through which a coolant may be pumped from an external source, not shown. It is evident that the number of ducts required to obtain the desired cooling will depend upon the magnitude of current supplied to the primary winding from the energizing source and the ratio of primary to secondary turns as well as the size of the structure. A dust cover 26 can be furnished, if desired, but such cover is not needed for mechanical reinforcement.

For large coils, good efficiency can be obtained with large pulse times since the penetration depth varies as the square root of the applied frequency. Generally speaking, large field volumes will be produced at high efficiencies. If small field volumes are used, the flux concentrator is less efficient than other structures such as the helical multiturn coil unless short pulse times are employed.

Figure 6:
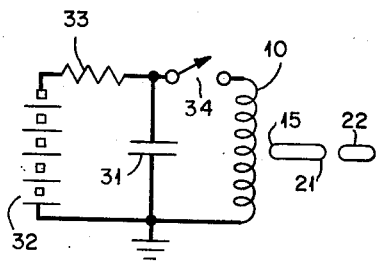
FIGURE 6 is a schematic diagram of the equivalent circuit of the device of FIGURE 4.

FIGURE 6 shows schematically the equivalent circuit of the device. The flux concentrator of FIGURE 4 may be thought to act in such a way that the multiturn primary serves as an impedance matcher to the power source and the insert becomes a transformer coupled single turn coil. A multiturn primary coil 10 is shown inductively coupled to the single turn secondary at the outer surface 15 thereof. The current flow is completed through the inner threaded region 21, which in turn is coupled to the insert 22 which also acts as a single turn. Single turn 22, being slotted completes its circuit through the innermost surface. To complete the circuit, a high voltage capacitor 31 is shown connected to a direct current supply 32 through a current limiting resistor 33. The energy stored in capacitor 31 is discharged through primary winding 10 by closing switch 34.

Various circuits for discharging capacitors of moderate capacity, for example 2000 $\mu f.$, charged from 500 to 4000 volts at a predetermined time have been devised, as shown in the paper by Kim and Platner mentioned above, and are well known in the art.

A flux concentrator having an axial length of 8 inches and an outside diameter of 6 inches was wound with a 17 turn primary winding imbedded in a helical slot as shown in FIGURE 4. When energized from a 2000 $\mu f.$—3000 volt surge supply fields as high as 450 kilogauss were secured with no mechanical or electrical failure of the primary winding, although mechanical deformation of copper and brass inserts occurred.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A flux concentrator for a high intensity pulsed electromagnet comprising, a massive cylindrical metallic block having a central axial bore and having a helical slot extending along the outer surface thereof, the inner surface of said cylinder being shorter in axial length than said outer surface, an electrical conductor imbedded in said slot and spaced from the walls of said slot by electrical insulating material to form a multi-turn coil, said cylinder having a radial slit extending axially from said inner surface to said outer surface to form a single turn rigid coil closely coupled to said multi-turn coil, whereby currents induced in said outer surface by the application of electrical pulses to said multi-turn coil flow along the surfaces of said cylinder to said inner surface to produce a region of high magnetic field intensity within said cylinder.

2. A flux concentrator for high intensity magnetic fields comprising, a massive hollow metallic cylinder, the axial length of the inner surface of said cylinder being less than the outer surface thereof, said cylinder having a radial slit extending from said inner surface to said outer surface along its length to form a rigid single turn coil, said cylinder having a deep helical slot formed in said outer surface with a pitch providing several convolutions, and an insulated electrical conductor imbedded in said slot to form a multi-turn coil closely coupled to said single turn coil, whereby leakage inductances and magnetic forces are minimized when said multiturn coil is energized.

3. A flux concentrator for high intensity magnetic fields comprising, a massive hollow metallic cylinder, the axial length of the inner surface of said cylinder being less than the outer surface thereof, said cylinder having a radial slit extending from said inner surface to said outer surface along its length to form a rigid single turn coil, said cylinder having a deep helical slot formed in said outer surface with a pitch providing several convolutions, and a plurality of parallel connected insulated electrical conductors imbedded in said slot to form a multi-turn coil closely coupled to said single turn coil, whereby leakage inductances and magnetic forces are minimized when said multiturn coil is energized.

4. A flux concentrator for high intensity pulsed magnetic fields comprising, a massive hollow metallic cylinder having a radial slit along the length thereof extending from the inner surface to the outer surface to form a rigid single turn coil, said inner surface of said hollow cylinder having a shorter axial length than said outer surface, said cylinder having a deep helical slot formed in said outer surface with a pitch providing several convolutions, the depth of said slot being greater than the width, and an insulated electrical conductor of substantially rectangular cross section imbedded in said slot to form a multi-turn coil closely coupled to said single turn coil, whereby leakage inductances and magnetic forces are minimized when energizing said multi-turn coil with electrical pulses.

5. A flux concentrator for high intensity pulsed magnetic fields comprising, a massive hollow metallic cylinder having a radial slit along the length thereof extending from the inner surface to the outer surface to form a rigid single turn coil, said inner surface of said hollow cylinder having a shorter axial length than said outer surface, said cylinder having a deep helical slot formed in said outer surface with a pitch providing several convolutions, the depth of said slot being greater than the width, and a plurality of parallel connected insulated electrical conductors, each having a cross section snugly fitting said slot width and imbedded in said slot to form a multi-turn coil closely coupled to said single turn coil, whereby leakage inductances and magnetic forces are minimized when energizing said multi-turn coil with electrical pulses.

6. A flux concentrator for high intensity pulsed magnetic fields comprising, a massive hollow metallic cylinder having a radial slit extending along the entire length of said cylinder from the outer surface to the inner surface thereof to form a first rigid single turn coil, the outer surface of said cylinder having formed therein a circumferential helical slot with several convolutions, an insulated electrical conductor imbedded in said slot to form a multi-turn winding closely coupled to said single turn coil, the inner surface of said cylinder being shorter in axial length than the outer surface and provided with a screw thread, and a threaded hollow metallic insert adapted to mate with the aforesaid thread of said cylinder, means to insulate said insert from said cylinder when so mated, said insert having a radial slit extending along the entire length thereof from the inner surface to the outer surface of said insert to form a second single turn coil closely coupled to said first single turn coil, the inner surface of said insert possessing a geometry to provide a high intensity magnetic field of predetermined configuration when said multi-turn winding is energized by electrical pulses.

7. A flux concentrator for high intensity pulsed magnetic fields comprising, a hollow metallic cylinder whose circular turn is broken by a narrow slit, the inner surface of said cylinder being shorter than the outer surface thereof, said outer surface of said cylinder being formed with a helical slot of greater depth than width and having a pitch providing several turns, an electrical conductor having a width substantially equal to the depth of said slot imbedded therein to form a multi-turn coil, and means electrically insulating said conductor from said cylinder.

8. A flux concentrator for high intensity pulsed magnetic fields comprising, a hollow metallic cylinder whose circular turn is broken by a narrow slit, the inner surface of said cylinder being shorter than the outer surface thereof, said outer surface of said cylinder being formed with a deep helical slot having a pitch providing several turns, an electrical conductor imbedded therein to form a multi-turn coil, and means electrically insulating said conductor from said cylinder.

9. The apparatus as defined in claim 8 wherein said inner surface of said cylinder is threaded to receive a non-contacting, threaded, slitted metallic insert shaped to produce a predetermined field configuration in the innermost region of said insert.

References Cited in the file of this patent
UNITED STATES PATENTS

| | | |
|---|---|---|
| 2,963,669 | Salisbury | Dec. 6, 1960 |
| 2,986,716 | Carlon | May 30, 1961 |
| 2,994,808 | Kolm | Aug. 1, 1961 |

OTHER REFERENCES

Babat et al.: Journal of Applied Physics, vol. 11, 1940, pp. 816–823.

"Furnace Production Aided by Fiberglas," Electrical World, June 8, 1946, p. 101.